US011272667B2

(12) United States Patent
Bump et al.

(10) Patent No.: US 11,272,667 B2
(45) Date of Patent: Mar. 15, 2022

(54) AUTOMATIC START/STOP CONTROLS FOR AGRICULTURAL LOAD AND TRANSFER EQUIPMENT

(71) Applicant: Digi-Star, LLC, Oakland, NJ (US)

(72) Inventors: Jerome Bump, Fort Atkinson, WI (US); Steven L. Johansen, Whitewater, WI (US); Ronald J. Schlimgen, Shell Rock, IA (US); Michael D. Van Mill, Shell Rock, IA (US); Shawn W. Gerdeman, Delphos, OH (US)

(73) Assignee: Digi-Star, LLC, Fort Atkinson, WI (US)

( * ) Notice: Subject to any disclaimer, the term of this patent is extended or adjusted under 35 U.S.C. 154(b) by 159 days.

(21) Appl. No.: 16/656,878

(22) Filed: Oct. 18, 2019

(65) Prior Publication Data

US 2020/0045887 A1    Feb. 13, 2020

Related U.S. Application Data

(63) Continuation of application No. 15/657,825, filed on Jul. 24, 2017, now Pat. No. 10,485,177, which is a (Continued)

(51) Int. Cl.
*A01D 90/10* (2006.01)
*A01K 5/02* (2006.01)
(Continued)

(52) U.S. Cl.
CPC ............... *A01D 90/10* (2013.01); *A01K 5/02* (2013.01); *B60P 1/36* (2013.01); *B60P 1/42* (2013.01);
(Continued)

(58) Field of Classification Search
CPC .. A01D 90/10; A01K 5/02; B60P 1/42; B65G 65/40; B65G 65/42; B65G 65/46;
(Continued)

(56) References Cited

U.S. PATENT DOCUMENTS 4,231,439 A * 11/1980 Hall, Jr ................ G01G 19/035
177/1
4,236,240 A    11/1980 Yoshida
(Continued)

FOREIGN PATENT DOCUMENTS

JP    2011167110 A    9/2011

OTHER PUBLICATIONS

Avery Weigh-Tronix, Scales for Agribusiness, "Model 915 Indicator User's Manual," Jun. 2, 2003, 36 pgs.
(Continued)

*Primary Examiner* — Randy W Gibson
(74) *Attorney, Agent, or Firm* — Chiesa Shahinian & Giantomasi PC

(57) ABSTRACT

A scale controller system and method of using the system is disclosed. The scale controller is adapted for use with a grain cart or similar implement that includes a discharge opening and conveyor. The system includes a scale and a plurality of sensors that work together to automate numerous functions that are typically performed manually. For example, the present invention discloses a system that automatically records the amount of material loaded or unloaded by continuously monitoring the load on a scale and the RPMs of a power take-off shaft that drives a conveyor.

20 Claims, 3 Drawing Sheets

Related U.S. Application Data continuation of application No. 14/743,020, filed on Jun. 18, 2015, now Pat. No. 9,763,389, which is a continuation of application No. 13/272,378, filed on Oct. 13, 2011, now abandoned.

(60) Provisional application No. 61/405,279, filed on Oct. 21, 2010.

(51) Int. Cl.

| | | |
|---|---|---|
| *G01G 19/12* | (2006.01) | |
| *G01G 19/08* | (2006.01) | |
| *G01G 13/06* | (2006.01) | |
| *B60P 1/36* | (2006.01) | |
| *B65G 65/40* | (2006.01) | |
| *G01G 13/16* | (2006.01) | |
| *B60P 1/42* | (2006.01) | |
| *B65G 65/42* | (2006.01) | |
| *B65G 65/46* | (2006.01) | |
| *B65G 69/00* | (2006.01) | |
| *G01G 11/00* | (2006.01) | |

(52) U.S. Cl.
CPC ............ *B65G 65/40* (2013.01); *B65G 65/42* (2013.01); *B65G 65/46* (2013.01); *B65G 69/00* (2013.01); *G01G 11/003* (2013.01); *G01G 13/06* (2013.01); *G01G 13/16* (2013.01); *G01G 19/08* (2013.01); *G01G 19/12* (2013.01)

(58) Field of Classification Search
CPC ...... B65G 69/00; G01G 11/003; G01G 13/06; G01G 13/16; G01G 19/08; G01G 19/12
See application file for complete search history.

(56) References Cited

U.S. PATENT DOCUMENTS

| | | |
|---|---|---|
| 4,274,790 A | 6/1981 | Barker |
| 4,345,628 A | 8/1982 | Campbell et al. |
| 4,465,211 A | 8/1984 | van der Lely et al. |
| 4,522,275 A | 6/1985 | Anderson |
| 4,635,739 A | 1/1987 | Foley et al. |
| 4,911,256 A | 3/1990 | Attikiouzel |
| 5,001,648 A * | 3/1991 | Baker .............. G07B 17/00362 177/25.15 |
| 5,016,197 A | 5/1991 | Neumann et al. |
| 5,285,020 A | 2/1994 | Jurca |
| 5,585,604 A * | 12/1996 | Holm ................... G01G 19/035 177/133 |
| 5,650,930 A | 7/1997 | Hagenbuch |
| 5,764,522 A | 6/1998 | Shalev |
| 5,880,407 A | 3/1999 | Flammang |
| 6,066,809 A | 5/2000 | Campbell et al. |
| 6,384,349 B1 | 5/2002 | Voll |
| 6,556,948 B1 | 4/2003 | McKenna |
| 6,621,014 B1 | 9/2003 | Tanner et al. |
| 7,104,425 B2 | 9/2006 | Le Roy |
| 7,507,917 B2 | 3/2009 | Kaltenheuser |
| 7,629,542 B1 | 12/2009 | Harding et al. |
| 7,633,021 B2 | 12/2009 | Pfohl et al. |
| 7,686,720 B2 | 3/2010 | Nikolai |
| 7,735,365 B2 | 6/2010 | Crain et al. |
| 7,858,888 B2 | 12/2010 | Lucas et al. |
| 8,097,820 B2 | 1/2012 | Klubertanz |
| 2001/0038018 A1 | 11/2001 | Bell et al. |
| 2005/0284381 A1 | 12/2005 | Bell et al. |
| 2006/0180100 A1 | 8/2006 | Nikolai |
| 2008/0127711 A1 | 6/2008 | Farag |
| 2009/0205877 A1 | 8/2009 | Claypool |
| 2012/0099948 A1 | 4/2012 | Bump et al. |
| 2013/0276709 A1 | 10/2013 | Ryder et al. |
| 2015/0204713 A1 | 7/2015 | Schlimgen et al. |

OTHER PUBLICATIONS

Avery Weigh-Tronix, Scales for Agribusiness, "Model 640 Series Indicator User Instructions," Feb. 2008, 54 pgs.
Digi-Star EZ 400 Operators Manual, Mar. 4, 2008, 22 pgs.

* cited by examiner

AUTOMATIC START/STOP CONTROLS FOR AGRICULTURAL LOAD AND TRANSFER EQUIPMENT

This application is a continuation of U.S. patent application Ser. No. 15/657,825, filed Jul. 24, 2017, which is a continuation of U.S. patent application Ser. No. 14/743,020, filed Jun. 18, 2015 and issued on Sep. 19, 2017 as U.S. Pat. No. 9,763,389, which is a continuation of U.S. patent application Ser. No. 13/272,378, filed Oct. 13, 2011, which claims priority to U.S. Provisional Patent Application No. 61/405,279 filed on Oct. 21, 2010, all of which are incorporated herein by reference in their entirety.

FIELD OF THE INVENTION

The present invention relates generally to the field of scale indicators and load cells for agricultural equipment. More particularly, the present invention relates to a scale system that includes start/stop controls.

BACKGROUND

In the field of agricultural scale indicators and load cells, there is a need to mix, blend, apply, or transport a variety of forage products (such as hay, corn, wheat, cotton seed, etc.). In certain applications, it is important to know the weight of certain materials, and it is also important to know the amount of materials that have been loaded onto or off of a scale. Scales are used as data management tools as well as material management tools to help the operator load or unload the correct amount of material and provide data to managers for record keeping. Certain conventional scale controls have a number of control buttons that must be pressed, in a particular order and at predetermined times, in order to ensure the proper operation of the scale and the carrier to which the scale is applied, and in order to ensure proper collection of the data as the material is being loaded, transported and unloaded. It is desirable to simplify the actions required by the operator to control a process, and to reliably record the transfer of material to or from the grain cart.

The scales and scale indicators described above are commonly used in conjunction with grain carts and other implements that load and unload bulk material. Grain carts are farm implements that are typically towed behind a tractor or other engine-driven vehicle and include a number of components. Farmers use grain carts to transport harvested grain from other implements, such as combines, and deliver the grain to trucks or other hauling devices away from the harvest field. The use of grain carts allows the harvester to remain in the field without having to return to a grain storage area to unload.

Grain carts typically include a storage carrier that further includes a hopper with a capacity ranging from several hundred to over one thousand bushels of grain. To unload the grain from the cart, grain carts employ a conveying device such as an auger or conveyor ("conveyor") to draw grain from the bottom of the hopper and convey it through a chute that deposits the grain wherever it is needed. The conveyor transports grain from the base of the hopper upward so that it may be deposited into another container.

At the bottom of the hopper, where the conveyor meets the hopper, is typically a door that must be opened in order for grain to flow onto the conveyor. The door serves the important purpose of keeping the grain or other material in the hopper until the operator desires to remove the material, and also of allowing the conveyor to come up to speed while under minimal load before the grain is loaded onto the conveyor. To provide power to the conveyor, grain carts are typically driven by a Power Take-Off ("PTO") driveshaft typically located at the rear end of a tractor. A PTO is typically powered by the tractor's engine.

Without a door separating the grain in the hopper from the conveyor, the conveyor would have to bear the entire weight of the grain present in the grain cart to begin conveying grain up the conveyor. Typical PTOs are not capable of generating the necessary torque to overcome such a load. In fact, if the conveyor is not up to the proper speed prior to opening of the door, the increased load may cause the PTO, or the engine driving the PTO, to stall, or other equipment to malfunction. To minimize the risk of stalling and malfunction, grain cart operators must be cognizant of their engine RPMs before starting the unloading process.

The current procedure for loading or unloading grain is complicated, involving a multitude of steps. As one specific example, using a Digi-Star Weigh Scale system to unload material already present in a carrier, where the display shows the current weight in the carrier includes the following steps: (1) the operator pressing the [Tare] button to zero-out the weight display, (2) the operator engaging the tractor PTO shaft to start the conveyor/auger, (3) the operator opening the hopper door to begin the grain flow, (4) when unloading is complete, the operator closing the hopper door, (5) the operator disengaging the PTO shaft to stop the conveyor/auger, (6) the operator pressing the [Print] button to save to a storage medium the amount that was off-loaded, and (7) the operator pressing the [Gross/Net] button, causing the display to show the weight of the materials remaining in the carrier.

This procedure is complicated, and is not easily explained or taught to an untrained, casual or part-time operator, and so a need exists for a simpler and more understandable scale control system. For example, there may be times when the operator forgets to press the [Tare] or [Print] key, causing the records reported to management to be inaccurate. The present invention provides an improvement over conventional operation of these scales.

SUMMARY

The present invention relates to a scale that includes an automatic start/stop function. According to the invention, an automatic start/stop control uses weight change, one or more sensors, or both the weight change and the sensor(s), to automatically start or stop a process. The invention also includes one or more sensors that monitor the PTO RPMs. This automatic start/stop control can be used to automatically start and stop the control process for applying manure, unloading grain, feeding animals, etc. from a storage carrier. Weight changes and process control information may be displayed to the operator during or in connection with use.

The Automatic Start/Stop control works similarly to pressing the [Start/Stop] key on the indicator, but eliminates the requirement of having the operator manually press the [Start/Stop] key during the load/unload operation. Once the operator has positioned the implement and is ready to begin the unloading process, the operator simply starts the equipment by engaging the PTO to start the conveyor. Next, the scale automatically determines that the process has started and either enters the "Start" mode or the "Stop" mode, as appropriate, depending on the state of the process. The Automatic Start/Stop control can be overridden by manually pressing the [Start/Stop] key.

The Automatic Start/Stop control system includes one or more sensors that continuously monitor the PTO RPMs and the load present on the conveyor. The entrance to the conveyor is separated from the material by the hopper door. The hopper door may be mechanically or hydraulically activated. In the present invention, the scale controller continuously monitors the RPMs of the PTO. Once the PTO speed reaches a level at which a stall is unlikely, the operator may open the door, thus starting the unloading process.

Depending on the implement, it may be possible to determine the weight of the material that is contained on the conveyor when the cart is unloading. Knowing that weight allows the operator to close the hopper door when the unloading process is nearing completion so that a minimal amount of material remains on the conveyor when the unloading process is complete. This is advantageous because it helps minimize waste and simplifies cleanup of the conveyor.

The Automatic Start/Stop control therefore ensures that the process will start or stop even if the operator forgets to press the [Start/Stop] key. Further, the Automatic Start/Stop control simplifies the actions required by the operator to control a process. Throughout the lifetime of the scale, the addition of the Automatic Start/Stop control would save hundreds, if not thousands of button presses.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

The present invention may be susceptible to embodiments in different forms. For example, a storage carrier for storing bulk material may be included in a variety of implements, including those that may be mobile or stationary. Such implements include but are not limited to grain carts, feed mixers, manure spreaders, grain bins, and seed tenders.

Figure 1:
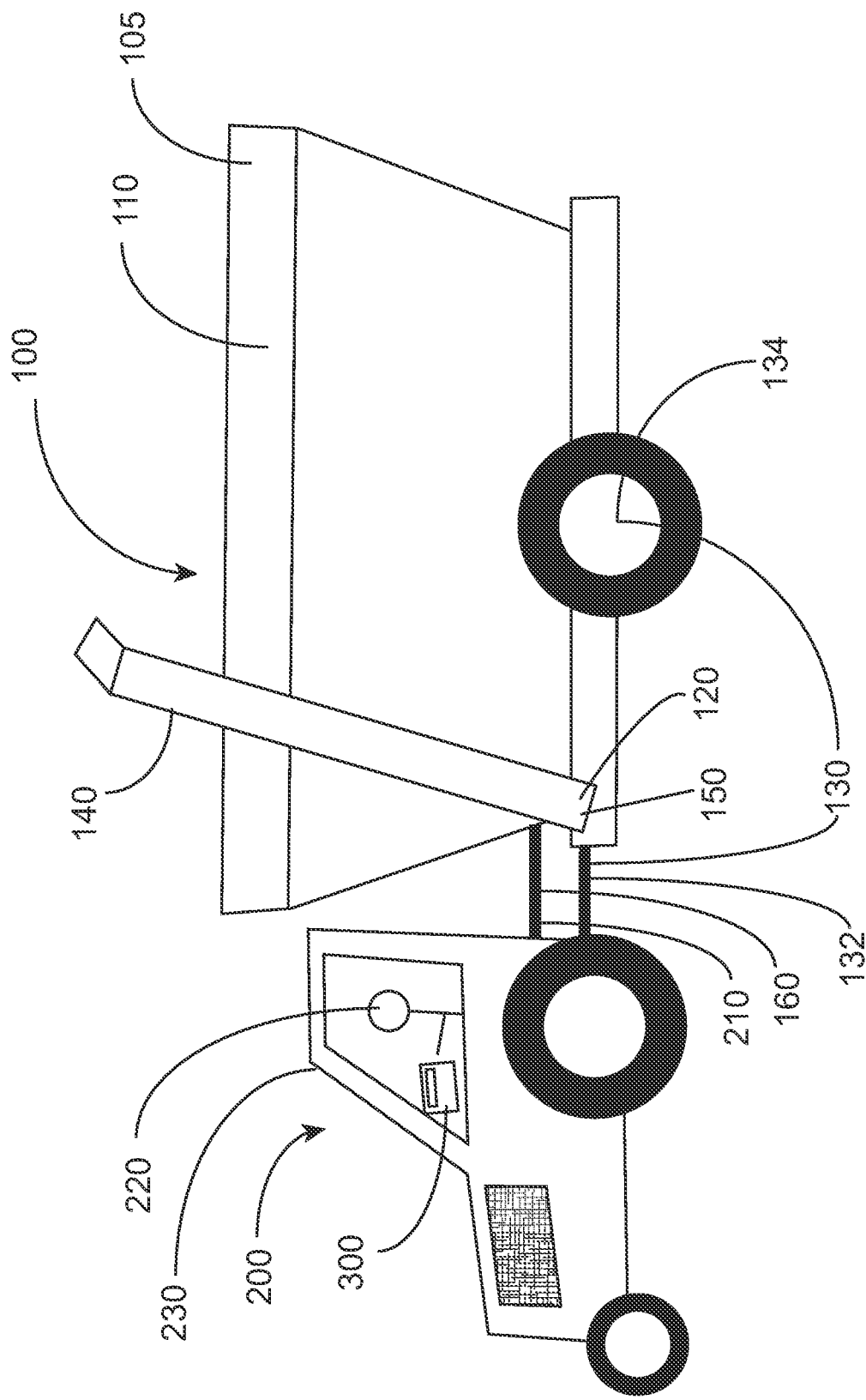
FIG. 1 is a view of a typical tractor/grain cart configuration in accordance with the present invention.

Referring now to FIG. 1, one embodiment of the automatic start/stop control in accordance with the invention is shown. A grain cart 100 comprises a storage carrier 105 that is configured to store material in a hopper 110 and discharge the material through an opening 120 at the base of the hopper 110. The storage carrier 105 includes a loadcell 130 that continuously monitors the weight of material present in the storage carrier 105. The loadcell 130 may be located in a number of locations, including but not limited to a hitch 132 or wheel axle 134. The opening 120 at the base of the hopper 110 is separated from a conveyor 140 by a hopper door 150. The hopper door 150 may be mechanically, hydraulically, or electrically actuated. The conveyor 140 is typically either an auger or belt conveyor. The conveyor 140 is driven by a PTO shaft 210 which is in turn driven by the engine or other power source of a tractor 200. There is a sensor 160 on the grain cart 100 that monitors the RPMs of the PTO shaft 210. The entire system is controlled by an operator 220 who sits in the cab 230 of the tractor 200. Inside the cab 230 is a scale control panel 300 that includes a plurality of buttons and a display.

Figure 2:
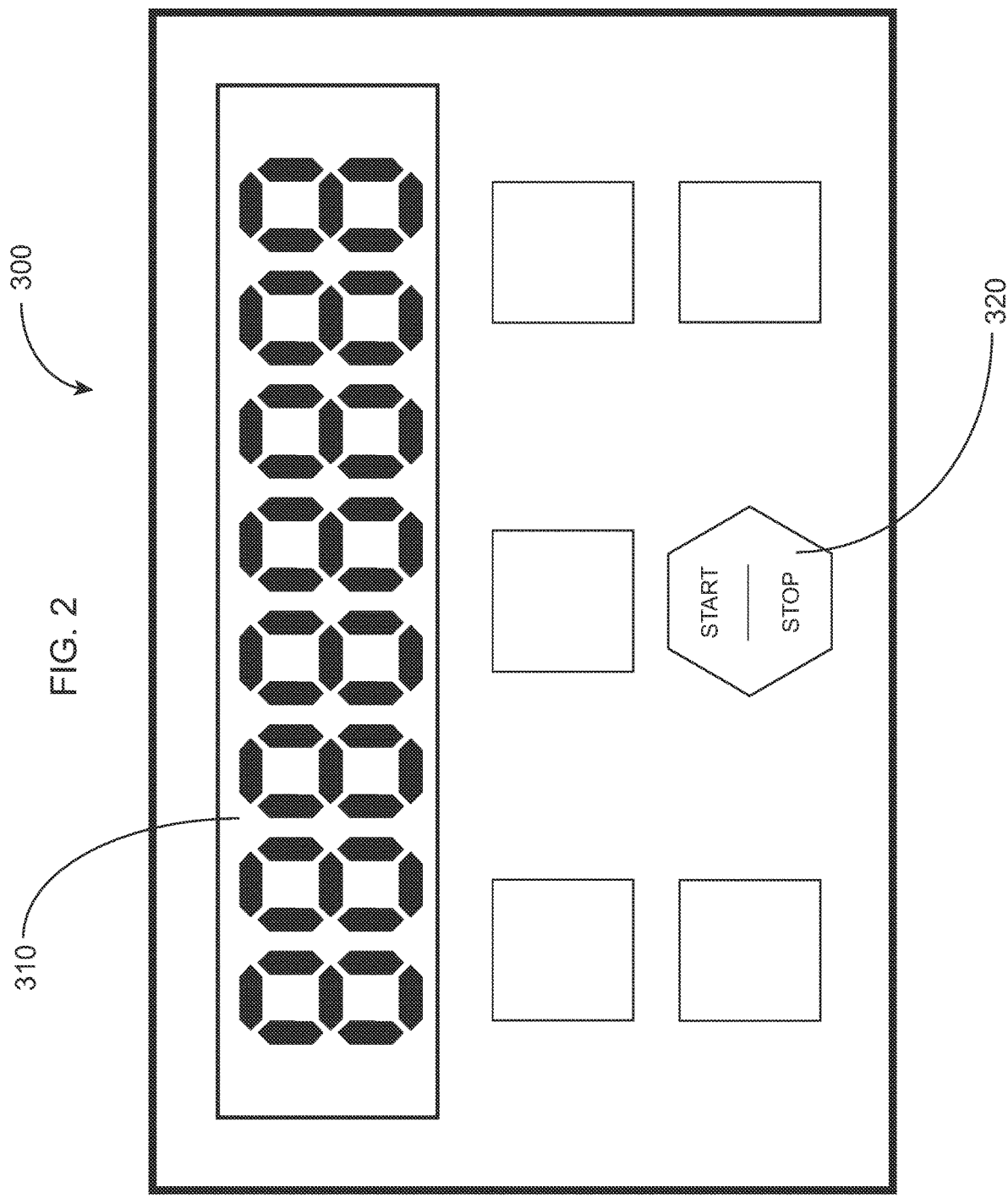
FIG. 2 is a view of the control panel on a scale controller in accordance with the present invention.

Turning now to FIG. 2, a view of the scale control panel 300 is shown in accordance with the present invention. The scale control panel 300 includes a display 310, on which various information is displayed. The scale control panel 300 also includes a plurality of buttons 320 on its face that control various functions of the automatic start/stop system.

Figure 3:
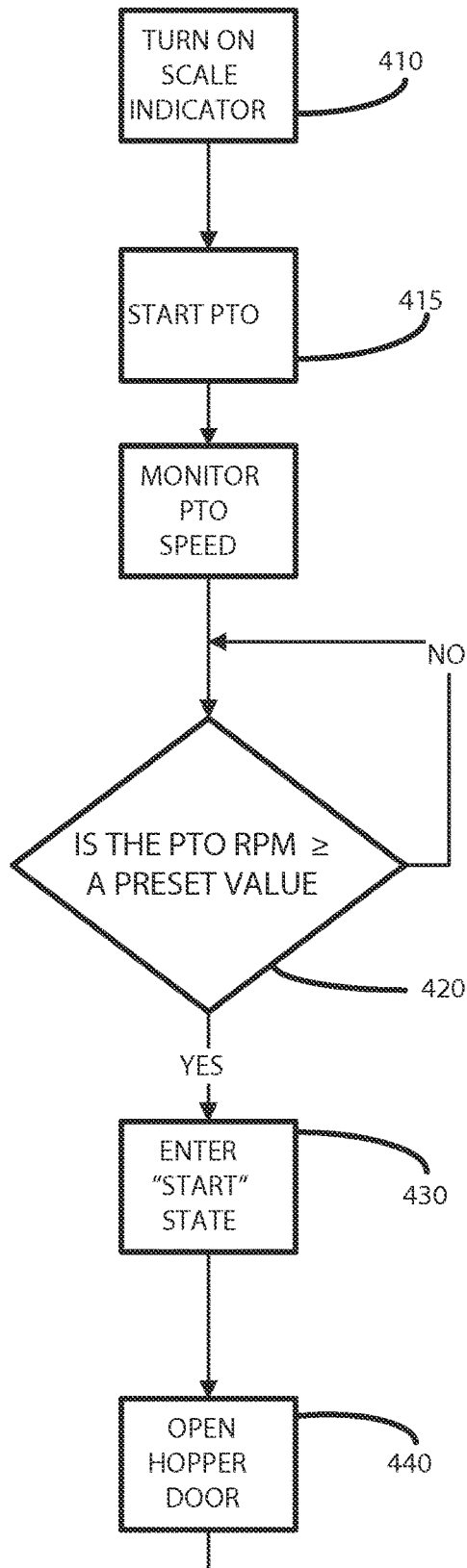
FIG. 3 is a block schematic showing the unloading process of grain in accordance with the present invention.
Figure 3:
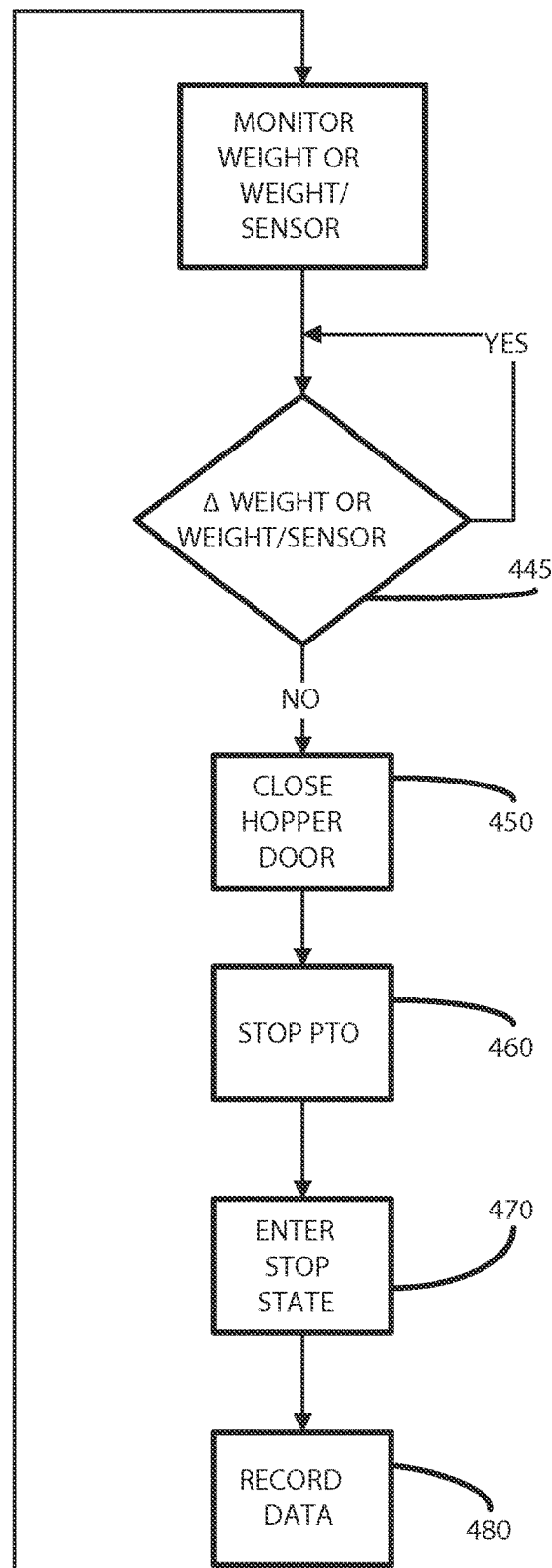

FIG. 3 is a flow chart 400 that illustrates a typical unloading sequence performed in accordance with the present invention. First, at step 410, the scale control panel 300 is turned on when the operator 220 starts the tractor 200. Next, at step 415 the operator 220 starts the PTO shaft 210. At decision gate 420, the sensor 160 that monitors the RPM's of the PTO shaft 210 is configured such that when the RPM's of the PTO shaft 210 reach a pre-determined speed at which the conveyor 140 may be safely loaded with material, the scale control system, at step 430, enters a "start" sequence. Next, at step 440, upon entering the "start" sequence, the operator 220 opens hopper door 150 to load the conveyor 140 with material. During the unloading sequence, at decision gate 445, the loadcell 130 continuously monitors the weight present in the hopper 110. Additionally, the sensor 160 on the PTO shaft 210 continuously monitors the RPM's of the PTO shaft 210. The system may notify the operator 220 if the RPM's of the PTO shaft 210 drop below a pre-determined value, prompting the operator 220 to manually adjust the opening of the hopper door 150 to decrease the flow rate of material onto the conveyor 140 to prevent a stall.

At step 450, when a pre-determined amount of material is unloaded from the hopper 110, the hopper door 150 may be closed, at which time any remaining material on the conveyor 140 is unloaded. Next, at step 460, the operator 220 disengages the PTO shaft 210. At step 470, when the conveyor 140 is completely unloaded, the system enters a "stop" sequence, thus completing the unloading sequence. Finally, at step 480, the amount of weight unloaded is recorded onto storage media.

EXAMPLE #1

The Automatic Start/Stop control can be used to automatically start, stop and record unloading material, such as grains, from a grain cart into a truck. The following is an example to demonstrate how the control would be used in this process.

The scale would have already been turned on and zero/balanced prior to obtaining the load from the combine. Once that load is obtained, and the operator of the grain cart decides to unload, the operator cart would pull alongside a truck and extend the grain cart auger over the truck hopper. The scale keeps a record of the gross weight and continuously monitors the load for weight changes. Once the conveyor is positioned properly, the operator begins the unloading process by engaging the PTO, thus starting the conveyor. When the system senses that the PTO is turning at or above a pre-designated RPM, and the operator confirms that the cart is properly positioned for unloading the grain from the cart, and opens the hopper door to allow grain to flow onto the conveyor. Thus the "Start" process is automatically begun by the scale. The operator continues to unload the amount desired and the scale continues to monitor the weight of the grain cart. Once the desired amount has been unloaded, the operator will stop unloading by closing the hopper door. The scale will sense that the weight stops changing and the scale will perform various checks to verify that the operator has finished unloading grain from the cart and automatically activate the "Stop" process for the scale. The data associated with this process, such as total weight unloaded, date, time, location, etc., is recorded at this time and the scale returns to weighing.

EXAMPLE #2

This example is similar to Example #1, but is used to unload manure.

The scale would have already been turned on and zero/balanced prior to being loaded with manure. To unload, the operator of a manure spreader would enter the field and activate the PTO and hydraulics. Up to this point, the scale has been keeping a record of the gross weight loaded and continuously monitors the load for weight changes and changes in PTO RPM and hydraulic pressure. When the operator starts the manure spreading process, the sensors change states, which indicates that the operator has started unloading manure. The scale senses the activated sensors, does various checks to confirm that the operator is actually unloading the manure from the spreader and automatically begins the "Start" process. The operator continues to unload the amount of manure desired and the scale continues to monitor the sensors and the weight of the manure. Once the sensor is de-activated or the desired amount of manure has been unloaded, the scale will perform various checks to verify that the operator has finished unloading manure from the spreader and automatically activate the "Stop" process for the scale. The data associated with this process, such as total weight unloaded, date, time, location, etc., is recorded at this time and the scale returns to weighing.

EXAMPLE #3

This example is similar to Example #1, but is used to unload feed for livestock.

The Automatic Start/Stop control can be used to automatically start, stop and record unloading material, such as feed from a feed mixer into a feed bunk in a pen. The following is an example to demonstrate how the control would be used in this process.

The scale would have already been turned on and zero/balanced prior to the feed mixer being loaded with the various components of the rations to be mixed, and the mixer will have already mixed the components to arrive at the mixed ration. To unload, the operator of the feed mixer would pull alongside the feed bunk for the pen and start the feed mixer. The scale maintains a record of the gross weight when loaded and continuously monitors the mixer for weight changes. When the operator starts unloading feed to the feed bunk, the scale senses the weight changing and does various checks to verify that the operator is actually unloading feed from the mixer. When the scale senses a change in weight, it automatically begins recording, thus automatically beginning the "Start" process. The operator continues to unload the amount desired and the scale continues to monitor the weight of the feed mixer. Once the desired amount has been unloaded to that feed bunk, the system will automatically stop the unload process. When the weight stops changing, the scale will perform various checks to verify that the unloading process is complete and automatically activate the "Stop" process for the scale. The data associated with this process, such as total weight unloaded, date, time, location, etc., is recorded at this time and the scale returns to weighing.

EXAMPLE #4

This example is similar to Example #3, but includes a PTO sensor attached to the machine that helps identify when the operator is able to start and stop unloading by monitoring the speed at which the PTO shaft is spinning at any given time.

The scale would have already been turned on and zero/balanced prior to the feed mixer being loaded with the rations to be mixed, and the mixer will have mixed the components. To unload, the operator of the feed mixer would pull alongside the feed bunk for the pen and start the feed mixer. The scale maintains a record of the gross weight when the feed mixer is loaded and continuously monitors the weight and sensor for changes that indicate that the operator has activated the feed mixer for unloading. When the scale senses the sensor activate, it does various checks to verify that the operator is actually unloading the feed from the mixer. Thus the scale automatically begins the "Start" process. The operator continues to unload the amount desired and the scale continues to monitor the weight of the feed mixer and the sensor. Once the sensor is de-activated or the desired amount has been unloaded, the scale will perform various checks to verify that the operator has finished unloading feed from the feed mixer and automatically activate the "Stop" process for the scale. The data associated with this process, such as total weight unloaded, date, time, location, etc., is recorded at this time and the scale returns to weighing.

Although the invention has been herein described in what is presently perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:
1. A method of automatically recording a weight of material unloaded from a storage carrier comprising:
   monitoring the weight of a storage carrier;
   automatically recording a total weight unloaded from the storage carrier in response to:
   1) determining that the weight of the storage carrier starts changing; and
   2) determining that the weight of the storage carrier stops changing.
2. The method of claim 1 further comprising:
   recording a date of unloading from the storage carrier in response to the:
   1) determining that the weight of the storage carrier starts changing; and
   2) determining that the weight of the storage carrier stops changing.
3. The method of claim 1 further comprising:
   recording a time of unloading from the storage carrier in response to the:
   1) determining that the weight of the storage carrier starts changing; and

2) determining that the weight of the storage carrier stops changing.

4. The method of claim 1 further comprising:
recording a location of unloading from the storage carrier in response to the:
1) determining that the weight of the storage carrier starts changing; and
2) determining that the weight of the storage carrier stops changing.

5. The method of claim 1 wherein the monitoring comprises continuously monitoring the weight of the storage carrier for weight changes.

6. The method of claim 1, wherein the weight is monitored by a scale controller in communication with a load cell.

7. The method of claim 6, wherein the load cell is located remote from the scale controller.

8. A method for recording a total weight of material unloaded from an agricultural machine comprising:
monitoring a changing weight of a load of an agricultural machine;
determining that the weight of the load has stopped changing; and
automatically recording a total weight unloaded in response to the determining.

9. The method of claim 8 further comprising:
determining that the weight of the load has started changing.

10. The method of claim 8 further comprising:
recording a date of unloading in response to the determining.

11. The method of claim 8 further comprising:
recording a time of unloading in response to the determining.

12. The method of claim 8 further comprising:
recording a location of unloading in response to the determining.

13. The method of claim 8, wherein the weight is monitored by a scale controller in communication with a load cell.

14. The method of claim 13, wherein the load cell is located remote from the scale controller.

15. An apparatus comprising:
a control panel; and
a scale controller configured to monitor a changing weight sensed by a load cell and automatically record a total weight unloaded from an agricultural machine in response to determining that the weight stops changing.

16. The apparatus of claim 15, wherein a date of unloading is recorded in response to determining that the weight stops changing.

17. The apparatus of claim 15, wherein a time of unloading is recorded in response to determining that the weight stops changing.

18. The apparatus of claim 15, wherein a location of unloading is recorded in response to determining that the weight stops changing.

19. The apparatus of claim 15, wherein the load cell is in communication with the scale controller.

20. The apparatus of claim 19, wherein the load cell is located remote from the scale controller.

* * * * *